United States Patent
Fedor et al.

(10) Patent No.: US 10,876,913 B2
(45) Date of Patent: Dec. 29, 2020

(54) DEVICE AND METHOD FOR TESTING CRANE TONG GRIP STRENGTH

(71) Applicant: Morgan Engineering Systems, Inc., Alliance, OH (US)

(72) Inventors: Mark Len Fedor, Hartville, OH (US); Nelson Elroy Baker, Alliance, OH (US); Kenneth Dean Maurer, Louisville, OH (US)

(73) Assignee: Morgan Engineering Systems, Inc., Alliance, OH (US)

( * ) Notice: Subject to any disclaimer, the term of this patent is extended or adjusted under 35 U.S.C. 154(b) by 1 day.

(21) Appl. No.: 16/043,557

(22) Filed: Jul. 24, 2018

(65) Prior Publication Data

US 2019/0033149 A1    Jan. 31, 2019

Related U.S. Application Data

(60) Provisional application No. 62/537,543, filed on Jul. 27, 2017.

(51) Int. Cl.
  *G01L 5/00*    (2006.01)
  *G01M 13/00*   (2019.01)
  *G01L 25/00*   (2006.01)

(52) U.S. Cl.
  CPC .......... *G01L 5/0071* (2013.01); *G01L 5/009* (2013.01); *G01L 25/00* (2013.01); *G01M 13/00* (2013.01)

(58) Field of Classification Search
  CPC ...... B66C 17/12; B66C 1/425; Y10S 294/902
  See application file for complete search history.

(56) References Cited

U.S. PATENT DOCUMENTS

| | | | | |
|---|---|---|---|---|
| 4,360,110 A | * | 11/1982 | Sigman | B66C 1/425 212/318 |
| 5,948,961 A | * | 9/1999 | Asano | B60T 8/172 73/9 |
| 6,508,497 B1 | * | 1/2003 | Nerger | B23Q 7/04 294/102.1 |

* cited by examiner

*Primary Examiner* — Brandi N Hopkins
(74) *Attorney, Agent, or Firm* — Sand, Sebolt & Wernow Co., LPA (57) ABSTRACT

A device, system, and method for testing and measuring the grip strength of tongs for a crane system is provided. The device may include a frame body carrying a testing assembly configured to measure the tong grip strength. The system may include the grip strength tester used in conjunction with a crane including an operator tower and a pulley assembly operatively connected to the tongs. The method of use associated with the tong grip strength tester may include the steps of expanding a distance between teeth on the tongs and positioning the teeth adjacent sides of the testing assembly, then closing the tongs thereby clamping teeth to the sides of the testing assembly. Then, the testing assembly measures the compressive force associated with the tongs and registers the compressive force in a computer system to determine whether the grip strength is sufficient to lift a weighted slab of material.

11 Claims, 10 Drawing Sheets

DEVICE AND METHOD FOR TESTING CRANE TONG GRIP STRENGTH

CROSS REFERENCE TO RELATED APPLICATIONS

This application claims the benefit of U.S. Provisional Patent Application Ser. No. 62/537,543 filed Jul. 27, 2017, the entire disclosure of which is incorporated herein by reference.

BACKGROUND

Technical Field

The present disclosure relates generally to systems, devices, and methods for testing crane tong grip strength. More particularly, the present disclosure relates to a testing assembly including a load cell measuring the crane tong grip strength.

Background Information

Cranes often lift heavy items, such as weighted slabs of material. Some crane systems include an overhead control tower operatively connected to an overhead track system upon which a pulley assembly travels on a trolley riding along the tracks. A set of crane tongs may extend downward from the pulley assembly.

Cranes can open and close the set of tongs that include teeth to selectively grip the weighted slabs of material. The weighted slabs of material can often be very heavy. The maximum weight of the slabs is the capacity of the tongs.

SUMMARY

As the tongs system is used, it may lose some of its gripping capacity and as a result, not support the weight of the lifted load. The present disclosure addresses the way to check the quality of the gripping system.

In one aspect, the disclosure may provide a crane tong grip strength tester comprising: a frame including first and second ends defining a longitudinal axis therebetween and including first and second sides defining a transverse axis therebetween; and a testing assembly carried by the frame, wherein the testing assembly includes a width sized to be received between opposing teeth on a crane tong; wherein the crane tong grip strength tester determines crane tong grip strength when the teeth engage sides of the testing assembly. The exemplary embodiment, or another exemplary embodiment may further provide a neutral first position of the testing assembly; a measuring second position of the testing assembly; and wherein a rod on testing assembly is moveable from the neutral first position to the measuring second position. The exemplary embodiment, or another exemplary embodiment may further provide a compressive movement of the rod from the neutral first position to the measuring second position. The exemplary embodiment, or another exemplary embodiment may further provide a measured force registered at a load cell when the rod is at the measuring second position; and grip strength logic in a computer associating the measured force with an effective grip strength of crane tongs for lifting weighted material. The exemplary embodiment, or another exemplary embodiment may further provide wherein the measured force is a compressive force. The exemplary embodiment, or another exemplary embodiment may further provide a resting first position associated with the frame; a lifted second position associated with the frame; and wherein the testing assembly measures crane tong grip strength when the frame is at the lifted second position. The exemplary embodiment, or another exemplary embodiment may further provide a second testing assembly carried by the frame spaced from the testing assembly defining a loading area therebetween, wherein the second testing assembly includes a width sized to be received between a second set of opposing teeth on the crane tong. The exemplary embodiment, or another exemplary embodiment may further provide weighted slabs of material positioned above the loading area supported by the frame. The exemplary embodiment, or another exemplary embodiment may further provide a rod aligned along a transversely extending rod axis; and a load cell operatively connected to one end of the rod. The exemplary embodiment, or another exemplary embodiment may further provide wherein the testing assembly further includes an end plate on the rod engageable with a cutout formed in the load cell. The exemplary embodiment, or another exemplary embodiment may further provide a wear pad connected to an end of the rod, wherein the wear pad faces outwardly from the testing assembly; and a wear plate facing outwardly in an opposite direction. The exemplary embodiment, or another exemplary embodiment may further provide a keyway operatively connected to the rod to maintain transverse alignment of the rod during tong strength testing. The exemplary embodiment, or another exemplary embodiment may further provide wherein the keyway prevents rod movement in a direction associated with the longitudinal axis of the frame. The exemplary embodiment, or another exemplary embodiment may further provide wherein the keyway prevents rotational movement of the rod about a rod axis.

In another aspect, the disclosure may provide a crane tong grip strength testing assembly including a rod aligned along a transversely extending rod axis; and a load cell operatively connected to one end of the rod. The testing assembly may also include an end plate on the rod matingly engageable with a cutout formed in the load cell. The testing assembly may further includes a wear pad connected to an end of the rod, wherein the wear pad faces outwardly from the testing assembly; and a wear plate facing outwardly in an opposite direction. The testing assembly may further includes a keyway maintaining transverse alignment of the rod during tong strength testing. Additionally, the keyway may prevent movement in a direction associated with the longitudinal axis of a frame carrying the testing assembly, or the keyway may prevent rotational movement of the rod about a rod axis.

In another aspect, the disclosure may provide a device, system, and method for testing and measuring the grip strength of tongs for a crane system. The device may include a frame body carrying a testing assembly configured to measure the tong grip strength. The system may include the grip strength tester used in conjunction with a crane including an operator tower and a pulley assembly operatively connected to the tongs. The method of use associated with the tong grip strength tester may include the steps of expanding a distance between teeth on the tongs and positioning the teeth adjacent sides of the testing assembly, then closing the tongs thereby clamping teeth to the sides of the testing assembly. Then, the testing assembly measures the compressive force associated with the tongs and registers the compressive force in a computer system to determine whether the grip strength is sufficient to lift a weighted slab of material, wherein the weight of the slabs is indexed in the computer system.

In another aspect, the disclosure may provide a crane grip strength system including a crane including an overhead operator tower, a pulley assembly operatively connected to the operator tower, and a set of tongs operatively connected to the pulley assembly such that an operator can selectively operate the tongs by moving the pulley assembly. The system may further including a grip strength tester including a testing assembly for measuring the grip strength of the tongs. The testing assembly includes a load cell operatively connected to a computer having grip strength logic configured to communicate with a user or the operator to indicate whether the grip strength of the tongs is sufficient to lift a separate piece of material, such as a weighted slab.

In accordance with yet another aspect, the present disclosure may provide any one of a device, system, and method for testing and measuring the grip strength of tongs for a crane system. The device may include a frame body carrying a testing assembly configured to measure the tong grip strength. The system may include the grip strength tester used in conjunction with a crane including an operator tower and a pulley assembly operatively connected to the tongs. The method of use associated with the tong grip strength tester may include the steps of expanding a distance between teeth on the tongs and positioning the teeth adjacent sides of the testing assembly, then closing the tongs thereby clamping teeth to the sides of the testing assembly. Then, the testing assembly measures the compressive force associated with the tongs and registers the compressive force in a computer system to determine whether the grip strength is sufficient to lift a weighted slab of material.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
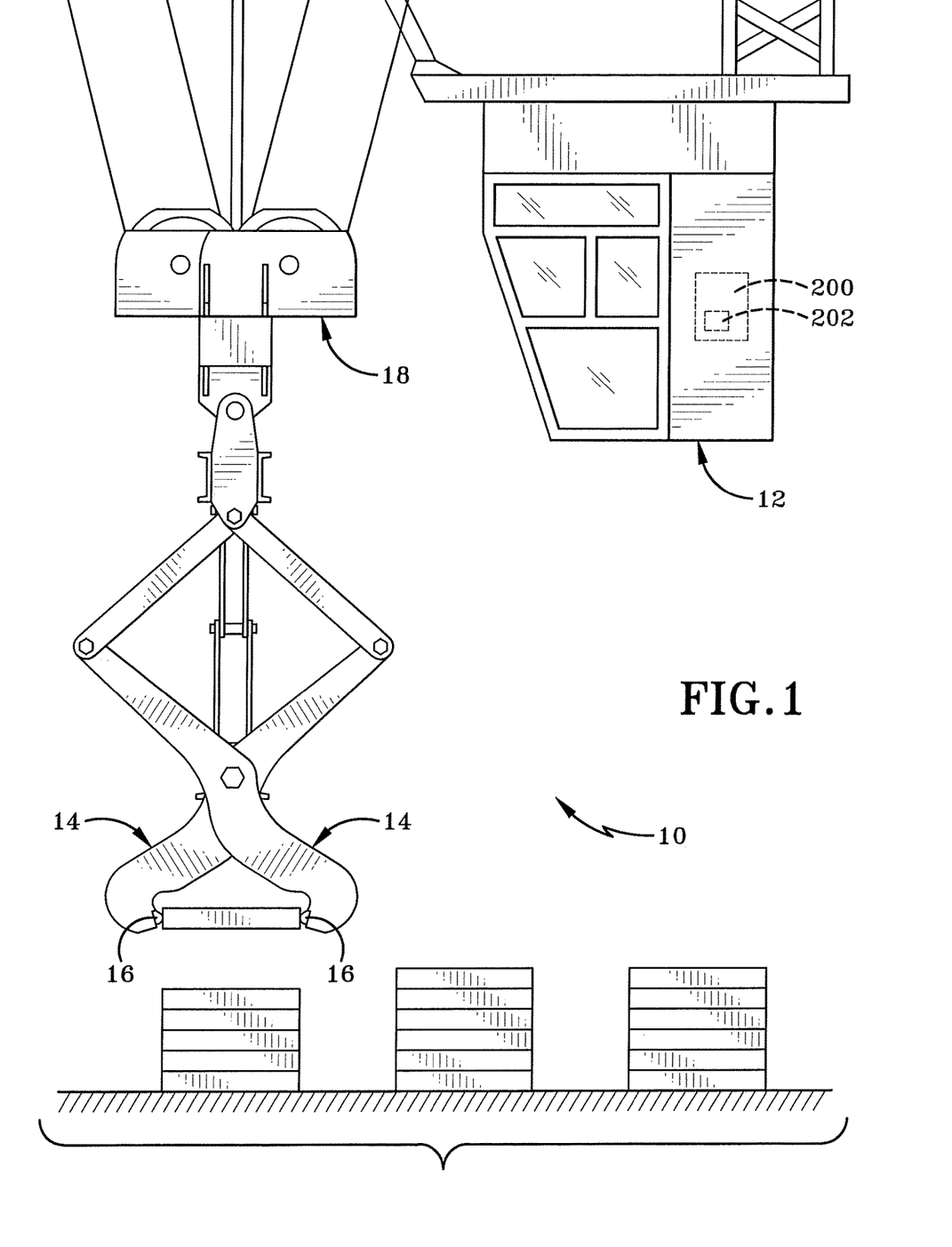
FIG. 1 is an exemplary side elevation of a crane system include an operator tower, a pulley assembly, and a set of crane tongs configured to lift weighted slabs of material.
Figure 2:
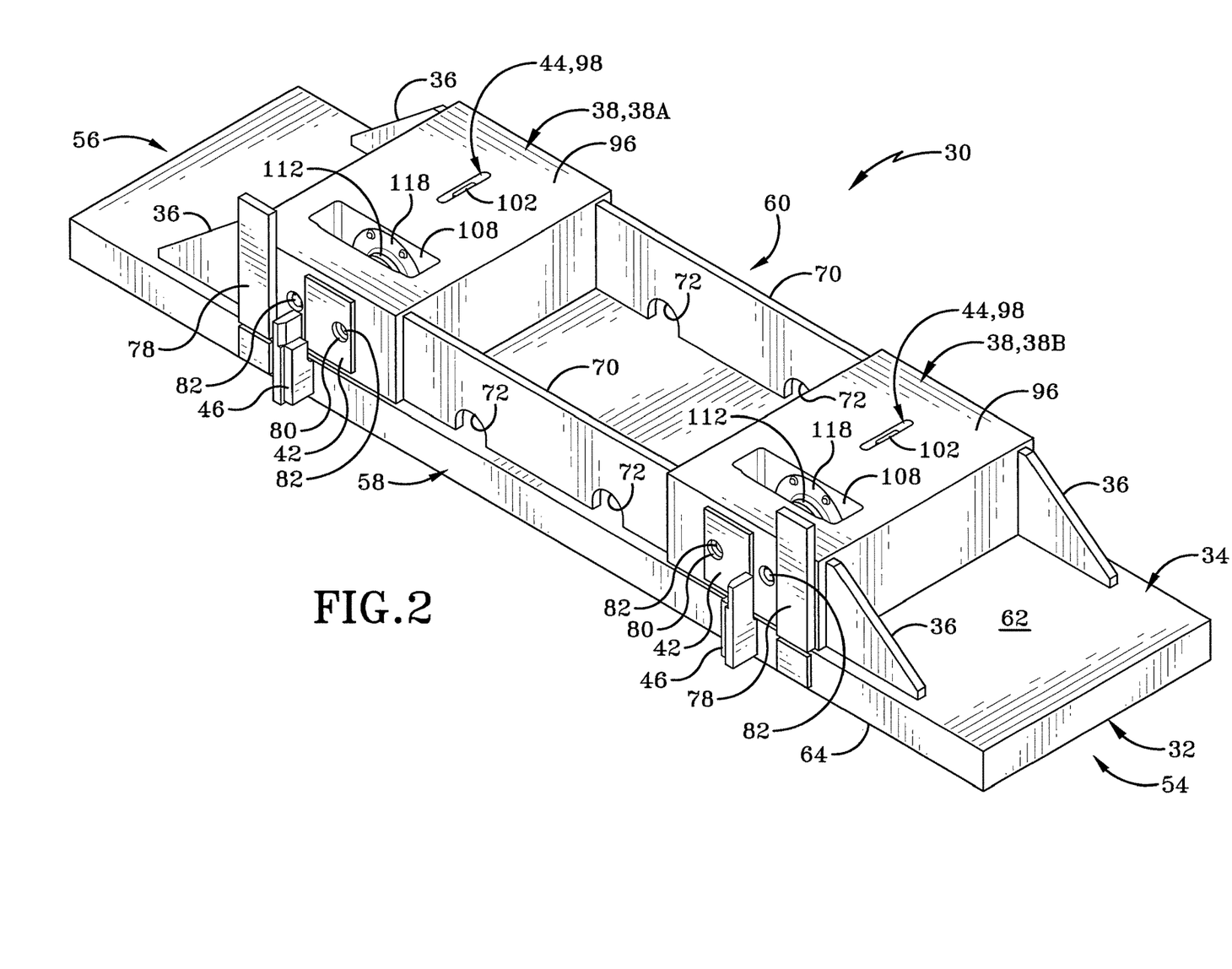
FIG. 2 is a top perspective view of a crane tong grip strength tester in accordance with one aspect of the present disclosure.

FIG. 1 depicts a crane system 10 including an operator tower 12, a set of articulated lifting tongs 14 including a set of tong teeth 16, and a cable and pulley assembly 18. Operator tower 12 is operatively connected to the cable and pulley assembly 18 which is operatively connected to the set of articulated lifting tongs 14. An operator positioned within tower 12 may control the tongs 14 by selectively moving cables and pulleys to thereby selectively lift, move, and place weighted slabs of material in various locations at a facility or warehouse.

Aspects of the present disclosure work in conjunction with crane system 10. Particularly, the present disclosure relates to a grip strength tester to measure gripping strength for articulated tongs 14 at its teeth 16 for ensuring the cable system is able to lift weighted slab(s), or other weighted items.

As depicted throughout FIG. 2-FIG. 10, a crane tong grip strength tester is shown generally at 30. Grip strength tester 30 may include a frame body 32 including a base plate 34 and at least one gusset plate 36. Grip strength tester 30 may also include at least one grip testing assembly 38 including a wear pad 40, a wear plate 42, a keyway 44, a first guide 46, a second guide 48, an internal rod 50, and a load cell 52, amongst other components which will be described in greater detail below.

Frame body 32 includes a first end 54 and a second end 56 defining a longitudinal direction therebetween. Frame body 32 also includes a first side 58 and a second side 60 defining a transverse direction therebetween. Base plate 34 further includes an upwardly facing top surface 62 and a downwardly facing bottom surface 64 defining a vertical direction therebetween.

A longitudinally extending midline 66 is imaginary, but will be made reference to herein for the purpose of describing the position of various components relative to either the midline 66 or other components. (Note: midline 66 may also be referred to longitudinal axis 66 throughout this disclosure for ease of explanation of other components). A transversely midline 68 is imaginary and may be referred to herein for the purpose of describing the position of components relative the transversely extending midline 68 or other components. (Note: midline 68 may also be referred to transverse axis 68 throughout this disclosure for ease of explanation of other components).

Figure 3:
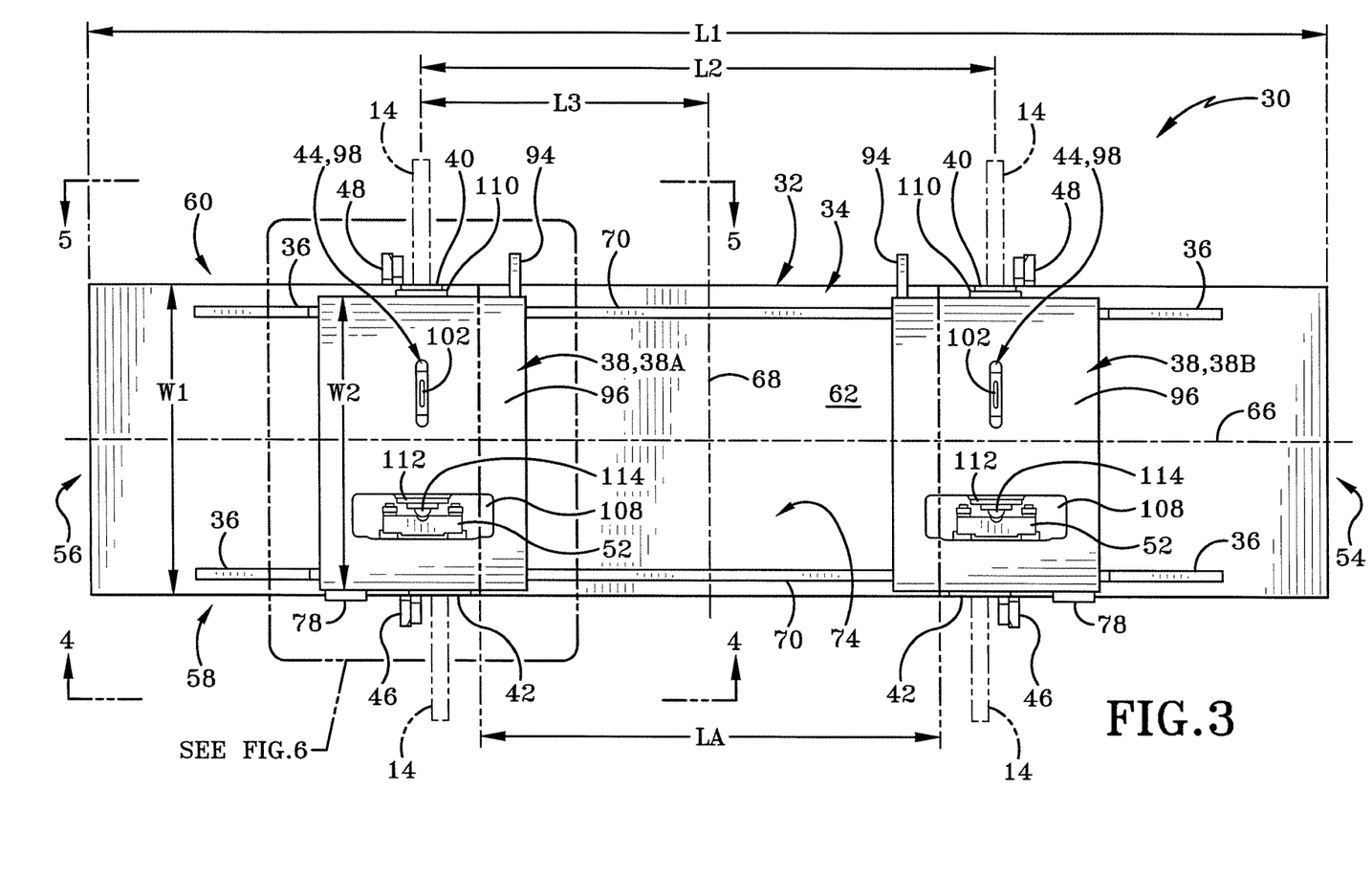
FIG. 3 is a top plan view of the crane tong grip strength tester.

As depicted in FIG. 3, a plurality of dimensions are associated with frame body 32. Particularly, the base plate 34 of frame body 32 has a first length L1 which extends from first end 54 to second end 56. First length L1 may be in a range from about 15 feet to about 25 feet, and in one particular embodiment, is about 20 feet. The base plate 34 has a transversely extending width W1 measured from first side 58 to second side 60. The first width may be in a range from about 4 feet to about 6 feet and in one particular embodiment, is about 5 feet. A second length L2 is associated with a distance between tong bit centers on a crane assembly. Second length L2 may be in a range from about 6 feet to about 10 feet and more particularly, the second length L2 between tong bit centers may be about 8 feet. Specifically, in one particular embodiment, the second length L2 between tong bit centers may be 8 feet and 8¾ inch.

Gusset 36 is a rigid member having a generally triangular shape extending vertically upward from the upwardly facing top surface 62 of base plate 34; however, other shapes are entirely possible. Gusset 36 is rigidly secured to base plate 34 with a generally vertical leg and a hypotenuse leg tapering downwardly towards an end of frame body 32.

Grip testing assembly 38 is structurally supported by frame body 32. In one particular embodiment, as shown by way of example throughout the figures, grip tester 30 includes a first grip testing assembly 38A and a second grip testing assembly 38B. For the purposes of this disclosure, components of grip testing assembly 38 will be made with reference to either one of the grip testing assemblies 38A or 38B. However, it is to be entirely understood that similar components exist on each of the grip testing assemblies.

First grip testing assembly 38A and second grip testing assembly 38B are offset on opposite ends relative to transversely extending midline 68. Each grip testing assembly 38A, 38B spans across longitudinally extending midline 66. In one embodiment, first grip testing assembly 38A and second grip testing assembly 38B may be mirrored opposites in construction relative to transversely extending midline 68. However, as depicted in FIG. 3, second grip testing assembly 38B is an identical translation offset from the first grip testing assembly 38A relative to transversely extending midline 68. In one example, assembly 38A is offset parallel to assembly 38B.

A second width W2 associated with grip testing assembly 38 extends transversely and spans across longitudinally extending midline 66. Second width W2 is less than first width W1. In one particular embodiment, second width W2 is in a range from about 4½ feet to about 5½ feet and in one particular embodiment, the second width W2 is about 4 feet 8¾ inches.

The first grip testing assembly 38A and the second grip testing assembly 38B are supported by base plate 34 and may be positioned above the upwardly facing top surface 62. The first and second grip testing assemblies 38A, 38B may be rigidly connected to base plate 34 and may be rigidly connected to gussets 36. In one particular example, first grip testing assembly 38A is rigidly secured to gussets 36 at the gusset's long upwardly extending vertical edge which enables the gusset 36 to taper downwardly towards base plate 34 towards second end 56. The second grip testing assembly 38B may be rigidly connected to base plate 34 and rigidly connected to gussets 36. The vertically extending upward edge of gusset 36 rigidly connects to second grip testing assembly 38B and extends in a tapered fashion downwardly towards base plate 34 towards first end 54.

Support plates 70 may extend intermediate first grip testing assembly 38A and second grip testing assembly 38B. Support plates 70 are rigid members extending upwardly from base plate 34 to a height just below the top of the grip testing assemblies 38A, 38B. Support plate 70 may include an arcuate cutout 72 having a downwardly facing concave edge formed in the bottom of support plate 70. The arcuate cutout 72 defines a small passageway above the upwardly facing top surface 62 on base plate 34. A slab loading region 74 is defined between the support plate(s) 70. Loading region 74 spans across transversely extending midline 68 and spans across longitudinally extending midline 66. An approximate length associated with the loading region is identified as length "LA" and may be in a range from about 5 feet to about 7 feet and in one particular embodiment, the approximate slab loading area length LA may be about 6 feet 1¼ inches.

Figure 4:
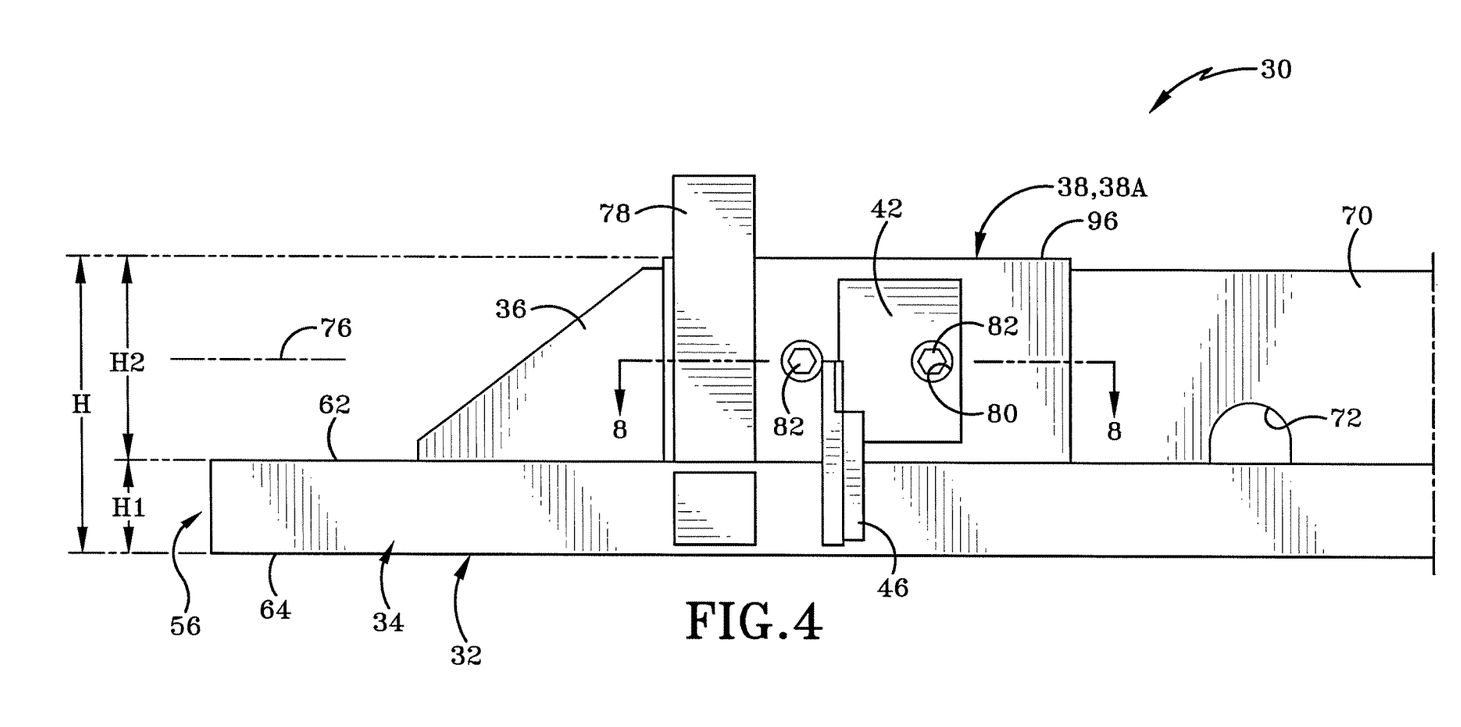
FIG. 4 is a partial first side elevation view of the crane tong grip strength tester taken along line 4-4 in FIG. 3.

As depicted in FIG. 4, base plate 34 has a first vertical height H1 measured from the downwardly facing bottom surface 64 to the upwardly facing top surface 62. The first height H1 may be in a range from about 6 inches to about 12 inches, and in one particularly example may be about 9 inches.

Each grip testing assembly 38 has a second vertical height H2 measured from the bottom of the grip testing assembly contacting the upwardly facing top surface 62 to the top of the grip testing assembly. The second vertical height H2 may be in range from about 15 inches to about 25 inches, however, in one particular embodiment the second vertical height H2 is 20 inches.

An imaginary vertical midline 76 is associated with the grip testing assembly 38. Imaginary midline 76 may be referred to herein for the purpose of describing the position of components relative the transversely extending midline 68 or other components. Additionally, midline 76 is associated with grip testing assembly 38 and not base plate 34; thus, midline 76 is half the second vertical height H2, such that when second vertical height H2 is 20 inches, the vertical midline 76 is 10 inches. In this instance, the vertical midline is 10 inches above the upwardly facing top surface 62 on base plate 34.

With continued reference to FIG. 4, gusset 36 spans across midline 76 extending from a higher connection with grip testing assembly 38 and tapers downwardly to a lower connection with base plate 34. The top of gusset 36 may terminate slightly below the top of grip testing assembly 38 such that gusset 36 has a height less than the second height H2. However, in other instances, the top of gusset may be flush with grip testing assembly or even extend above the top of grip testing assembly 38.

Similarly, plate 70 spans across midline 76 from its upwardly facing unbound top surface downwardly to a rigid connection with base plate 34. The top of plate 70 may terminate slightly below the top of grip testing assembly 38 such that plate 70 has a height less than the second height H2. However, in other instances, the top of plate 70 may be flush with grip testing assembly or even extend above the top of grip testing assembly 38. Notably, the height associated with the loading area 74 is not bound by plate(s) 70. As will be described in greater detail below, weighted slabs will be stacked above loading area 74 and the height of the loading area depends on the number of weighted slabs utilized to perform the grip strength test of teeth 16 on tongs 14.

Wear plate 42 is a rigid member and may extend vertically along the first side of the grip testing assembly 38. Wear plate 42 spans across the vertical midline 78. The top of wear plate 42 begins slightly below the top of grip testing assembly 38 and the bottom of wear plate terminates slightly above the bottom of grip testing assembly 38. The wear plate 42 defines at least one transversely extending through aperture 80 configured to receive a connector, or bolt 82, therethrough. Wear plate 42 is generally positioned inwardly (i.e., closer to the transversely extending midline 68) relative to the first guide 46.

First guide 46 is a rigid member and may extend vertically along the first side of the base plate 34 and vertically along the first side of the grip testing assembly 38. The top of first guide 46 begins proximate vertical midline 76 and extends below the bottom of grip testing assembly 38. The first guide 46 terminates at a bottom intermediate the upwardly facing top surface 62 and the downwardly facing bottom surface 64. First guide 46 is positioned inwardly (i.e., closer to the transversely extending midline 68) relative to a vertical plate 78. Vertical plate 78 is a rigid member positioned inwardly relative to gusset 36. Vertical plate 78 spans across the vertical midline 76 and extends upwardly from a rigid connection with base plate 34 and terminates at a top greater than the second height H2. Stated otherwise, vertical plate 78 is taller than grip testing assembly 38. The additional height of plate 78 stabilize tester 30 when the tester 30 is position on its side during a calibration process, as will be described in greater detail below with respect to FIG. 9.

Figure 5:
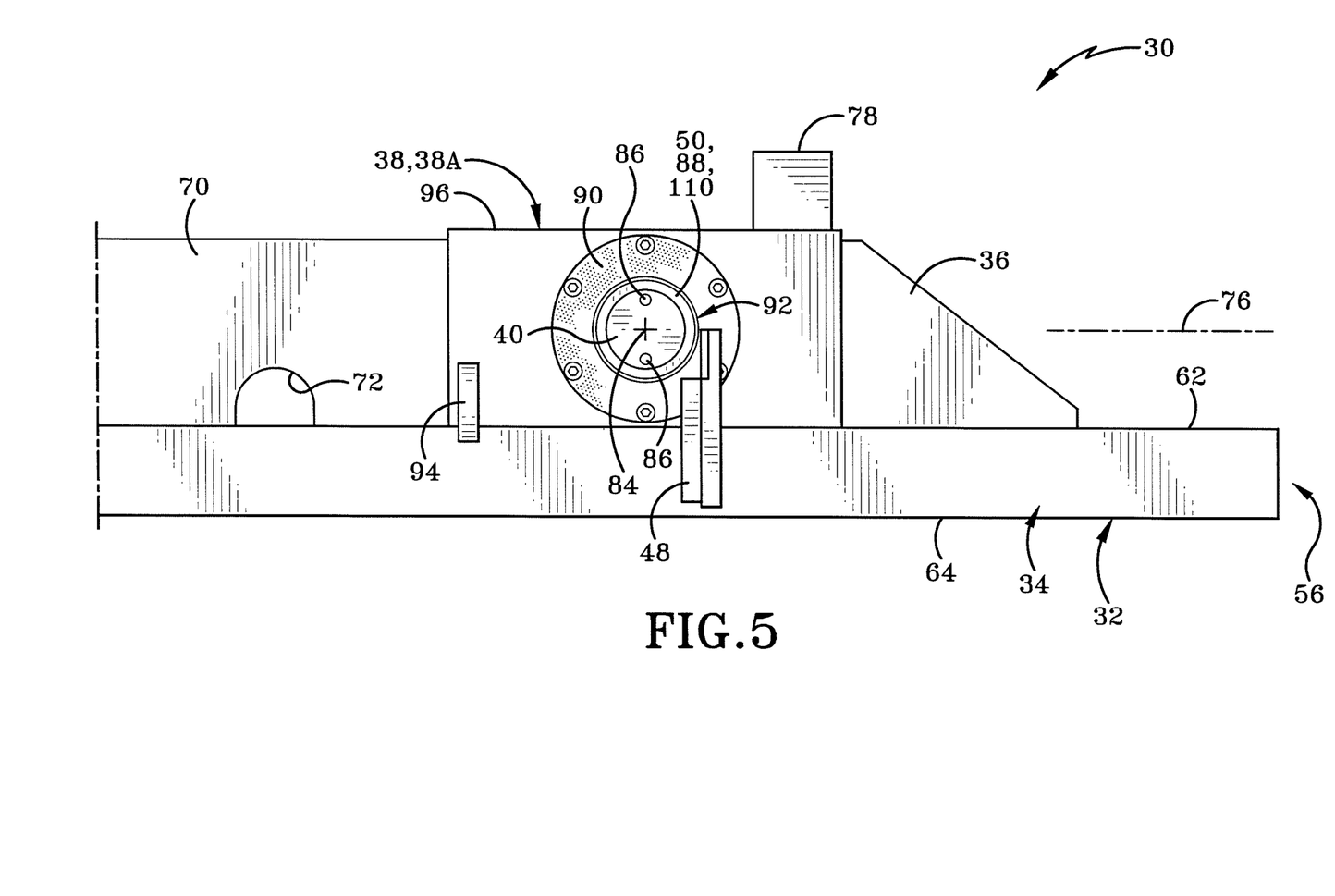
FIG. 5 is a partial second side elevation view of the crane tong grip strength tester taken along line 5-5 in FIG. 3.

As depicted in FIG. 5, the wear pad 40 on grip testing assembly 38A is positioned vertically above base plate 34 and is centered along rod axis 84. Rod axis 84 is shown in FIG. 5 as extending into and out of the page. The wear pad 40 is bolted, via bolts 86, to one end of rod 50. More particularly, rod 50 defines a cylindrically shaped recess at its end within which wear pad 40 resides. The cylindrical recess at the end of rod 50 is defined by an annular extension 88 centered along rod axis 84 and concentric with wear pad 40.

Wear pad 40 is a plinth-like or thick disc-shaped member formed from metal. Wear pad 40 includes an outer diameter generally equal to or slightly less than that of the cylindrically shaped recess at the end of rod 50. The diameter may be about eight inches, however this is not be construed in a limiting manner. The wear pad 40 has a thickness that is aligned with the transversely extending rod axis 84 and the thickness may be in a range from about one inch to about five inches, however, in one particular embodiment the wear pad thickness may be about two inches.

Figure 7:
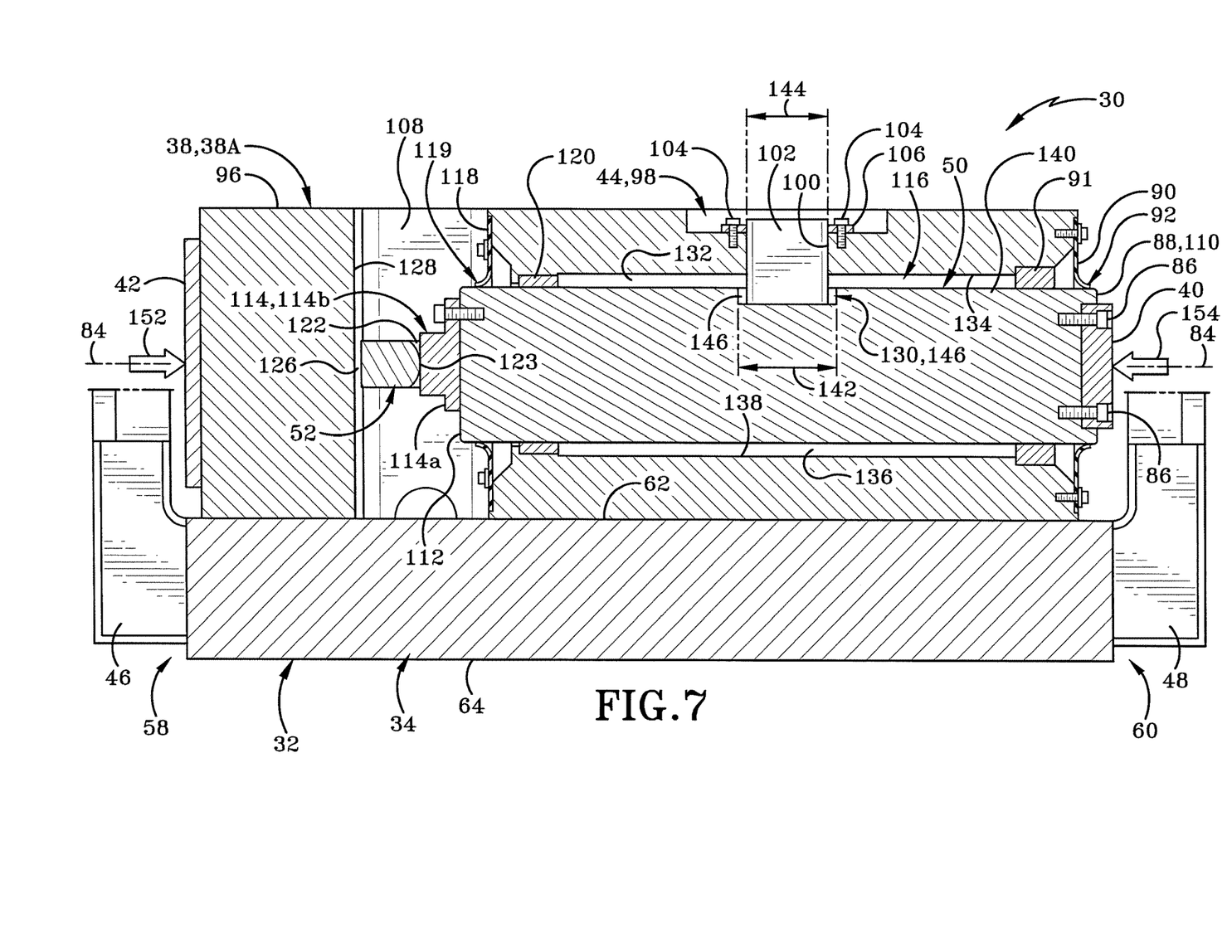
FIG. 7 is a transverse cross section taken through the testing assembly along line 7-7 in FIG. 6.

An annular-shaped member 90 and bushing 91 contact rod 50 adjacent the annular extension 88 and to form a seal at a location 92 (See also FIG. 7). Annular-shaped member 90 is held in place with a retaining ring to hold the seal in place which may also include a band clamp. Rod axis 84 is coplanar with vertical midline 76. Accordingly, wear pad 40 vertically spans across vertical midline 76. Additionally, annular-shaped member 90 and rod 50 vertically span across vertical midline 76 when viewed from the second side as depicted in FIG. 5.

In one implementation, annular-shaped member 90 is formed from rubber or neoprene or the like having an outer diameter in a range from about fifteen inches to about 20 inches. The annular-shaped member 90 defines an inner aperture having a diameter in a range from about five inches to about ten inches. Particularly, the inner aperture diameter of the annular-shaped member 90 is about seven inches. In each instance, the inner aperture diameter of annular-shaped member 90 is less than the diameter of rod 50 in an un-stretched state. This is because the rubber or neoprene material stretches and forms a bend near location 92 to thereby increase its inner diameter to fit over and around rod 50 adjacent annular extension 88 to create the seal at location 92. (See FIG. 7).

The second guide 48 includes a top end generally coplanar with vertical midline 76 extending downwardly along the second side of testing assembly 38A. The second guide 48 extends downwardly below the top surface 62 of base plate 34. Second guide 48 terminates above the downwardly facing bottom surface 64 on base plate 34. Second guide 48 is rigidly connected to both base plate 34 and the second side of first testing unit 38A and extends transversely outward away from the second side a short distance terminating at a free end.

Figure 6:
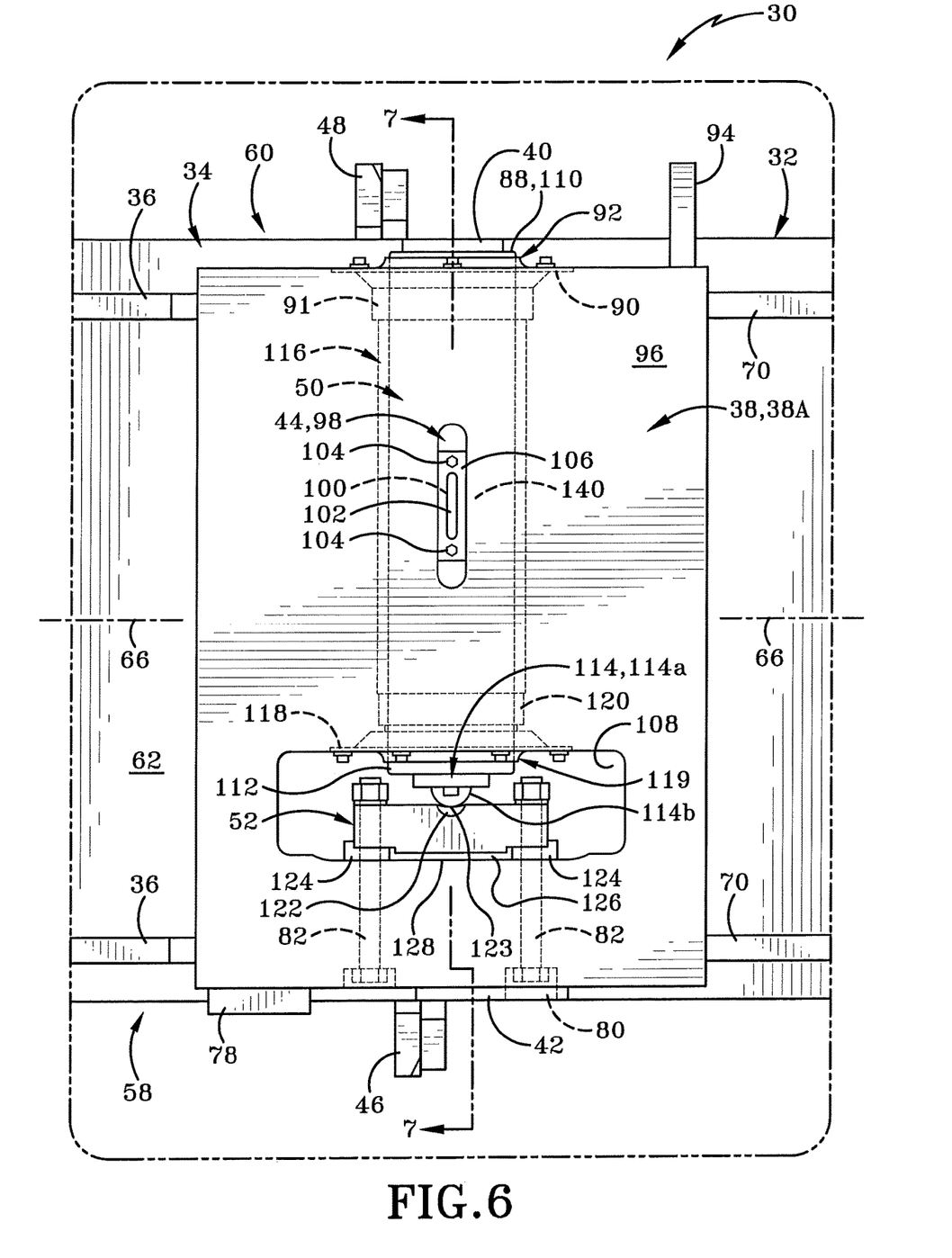
FIG. 6 is an enlarged top plan view of the region labeled "SEE FIG. 6" in FIG. 3 depicting a testing assembly on the crane tong grip strength tester.

As depicted in FIG. 6, first grip testing assembly 38A includes an upwardly facing top surface 96. A recessed area 98 is formed and extends vertically downward from top surface 96. Recessed area 98 extends generally transversely across testing assembly 38 and is generally rectangular having rounded ends. The recess 98 forms a portion of keyway 44 together with a through aperture 100 within which a key 102 resides. Key 102 fits within and is received by a slot 130 formed in the cylindrical sidewall of rod 50. Additionally, key 102 may be held in place via bolts 104 and a plate 106 thereby forming a seal.

The top surface 96 of testing assembly 38 further defines an aperture 108. Aperture 108 is aligned closer to the first side 58 relative to keyway 44 which is aligned closer to second side 60. Aperture 108 is generally longitudinally aligned and is rectangular in shape having rounded corners. The length of aperture 108 is greater than its width. Further, aperture 108 is a complete through aperture extending from the upwardly facing top surface 96 entirely through the body of testing assembly 38 to the bottom surface of testing assembly 38. When viewed from above, the upwardly facing top surface 62 of base plate 34 may be visible through aperture 108.

With continued reference to FIG. 6, the testing assembly 38 may further include a first end 110 of rod 50 to which wear pad 40 attaches, spaced opposite a second end 112 of rod 50 to which an end plate 114 attaches. End plate 114 and the second end 112 of rod 50 are disposed within aperture 108. Adjacent second end 112, the rod 50 may be secured within a cylindrical bore 116 defined by the first testing assembly 38A.

A second annular-shaped member 118 and second bushing 120 contact rod 50 adjacent its second end 112 and to form a seal at a location 119. The second annular-shaped member 118 is held in place with a retaining ring to hold the seal in place which may also include a band clamp. Second annular-shaped member 118 spans across vertical midline 76 when viewed from the second side as depicted in FIG. 5.

In one implementation, second annular-shaped member 118 is formed from rubber or neoprene having an outer diameter in a range from about fifteen inches to about 20 inches. The second annular-shaped member 118 defines an inner aperture having a diameter in a range from about five inches to about ten inches. Particularly, the inner aperture diameter of the second annular-shaped member 118 is about seven inches. In each instance, the inner aperture diameter of second annular-shaped member 118 is less than the diameter of rod 50 in an un-stretched state. This is because the rubber or neoprene material stretches and forms a bend near location 119 to thereby increase its inner diameter to fit over rod 50 adjacent annular extension 88 to create the seal at location 119. (See FIG. 7).

The end plate 114 includes a first portion 114a and a second portion 114b. The first portion of end plate 114 is generally rectangular in cross section and the second portion 114b of end plate 114 is generally hemispherical or semi-circular. The semi-circular second portion 114b of end plate 114 is configured to mateably fit within an arcuate cut out region 122 defined in a surface of load cell 52. In other particular embodiments, arcuate cut out 122 need not be exactly spherical but rather may have arcuate curves or linear curves that mateably engage end plate 114 in a complimentary manner such that the end most portion of rod 50 nests with load cell 52 in a complimentary manner. The mating engagement between portion 114b and cut out region 122 occurs at a location 123.

Load cell 52 is rigidly secured to testing assembly 38 via bolts 82 extending transversely through the body of testing assembly 38 through a wedge block 124. Wedge block 124 is a generally rigid member defining transversely extending through apertures through which bolts 82 extend. Wedge block 124 may include a slight tapering angled surface directly contacting load cell 52. The tapering angled surface on wedge block 124 may extended downwardly at an angle in a range from about 1° to about 10° relative to horizontal, and in one particular embodiment, the wedge block tapering angle is about 5°.

Inasmuch as wedge block 124 is a generally rigid member, a gap 126 is defined between load cell 52 and a wall 128 defining a portion of aperture 108. Gap 126 effectuates a more precise load cell testing strength observed and exerted by load cell 52 by reducing the surface contact area imparted and physically contacting load cell 52.

With continued reference to FIG. 6, guide 94 is disposed closer to transversely extending midline 68 relative to second guide 48 along the second side 60 of testing assembly 38. Guide 94 may define a longitudinally extending aperture extending therethrough which will be described in greater detail below.

As depicted in FIG. 7, rod 50 is a generally cylindrical member formed of a rigid metal having a generally rectangular profile in cross-section notwithstanding the annular extension 88 adjacent first end 110. Rod 50 is positioned centrally along rod axis 84 within cylindrical bore 116 defined by grip testing assembly 38. The vertical height of rod 50 is less than the vertical height associated with cylindrical bore 116. As such, a small gap 132 is defined between the cylindrical sidewall of rod 50 and a top wall 134 of grip testing assembly 38 that defines a portion of cylindrical bore 116. A second gap 136 is defined between the cylindrical sidewall of rod 50 and a bottom wall 138 defining a portion of cylindrical bore 116.

Dimensionally, by way of non-limiting example, rod 50 is a right cylindrical member having a transversely aligned rod length in a range from about thirty inches to about fifty inches, and in one particular embodiment the rod length is about forty inches. Rod 50 has an outer diameter, and in one particular embodiment the outer diameter of rod 50 is about ten inches. The ends of rod 50 may be chamfered however it is not required. Further, the diameter associated with the cylindrical recess at the end of rod 50 defined by the annular extension 88 is about eight inches. Thus, annular extension 88 has a radial thickness of about one inch (eight inch diameter of recess+one inch radial thickness times two (left and right)=ten inch outer diameter of rod 50).

With continued reference to FIG. 7, and when viewed in cross-section, the cylindrical sidewall of rod 50 includes an upwardly facing portion 140. The upwardly facing portion 140 of the cylindrical sidewall of rod 50 defines the slot 130. The slot 130 extends generally transverse to define a slot width 142. Slot 130 further has a vertical depth and the entire vertical depth associated with slot 130 is filled with key 102.

Key 102 has a transverse width 144. Key width 144 is less than slot width 142. Gaps 146 are formed on each side of key 102 when key 102 is disposed within slot 142 because key 102 has a smaller width 144 than the slot width 142. When viewed from above, the slot length relative to the longitudinal axis of testing assembly 38 is approximately equal that of key 102. This allows rod 50 to move slightly in the transverse direction along axis 184, but not move along longitudinal axis 66. Additionally, rod 50 is not configured to move in the vertical axis inasmuch as rod 50 is held in place by bushings 91, 120 and the direct contact of key 102 with the bottom of slot 130. Further, key 102 discourages and in some instances completely prevents the rod 50 from rotating about rod axis 84.

Additionally, bushings 91, 120 may be fabricated from cast bronze, however other materials are entirely possible. In one embodiment the bushings 91,120 are not similar in size. For example, bushing 91 may include an outer diameter of about 12.75 inches and an inner diameter defining a bushing through aperture (through which rod 50 is inserted) slightly greater than the outer diameter of rod 50. In this instance, inner diameter of bushing 91 is slightly greater than about 10 inches, for example, about 10.024 inches. In one embodiment, bushing 91 weighs about thirty five pounds and has transversely aligned width of about 2.5 inches. Bushing 120 may include an outer diameter of about 11.5 inches and an inner diameter defining a bushing through aperture (through which rod 50 is inserted) slightly greater than the outer diameter of rod 50. In this instance, inner diameter of bushing 120 is slightly greater than about 10 inches, for example, about 10.024 inches. In one embodiment, bushing 91 weighs about seventeen pounds and has transversely aligned width of about 2.5 inches.

Key 102 may have a vertically aligned height in a range from about three inches to about seven inches, however, in one particular embodiment the height of key 102 may be about five and one-quarter inches. Key width 144 may be in a range from about three inches to about seven inches, however, in one particular embodiment, the key width 144 may be about five inches. Further, a key thickness is aligned with the longitudinal axis of the frame body 32 and is in generally less than about two inches, and in one particular embodiment the key thickness is about 11/16 inch.

In accordance with one aspect of the present disclosure, grip strength tester 30 enables a crane operator to test the grip strength of crane tongs 14 at teeth 16 when the crane desires to lift a weighted slab 20 via pulley assembly 18. This testing of the tong grip strength enables the operator to ensure that item being lifted (i.e., weighted slab(s) 20) will be sufficient supported from above by the crane.

Figure 8:
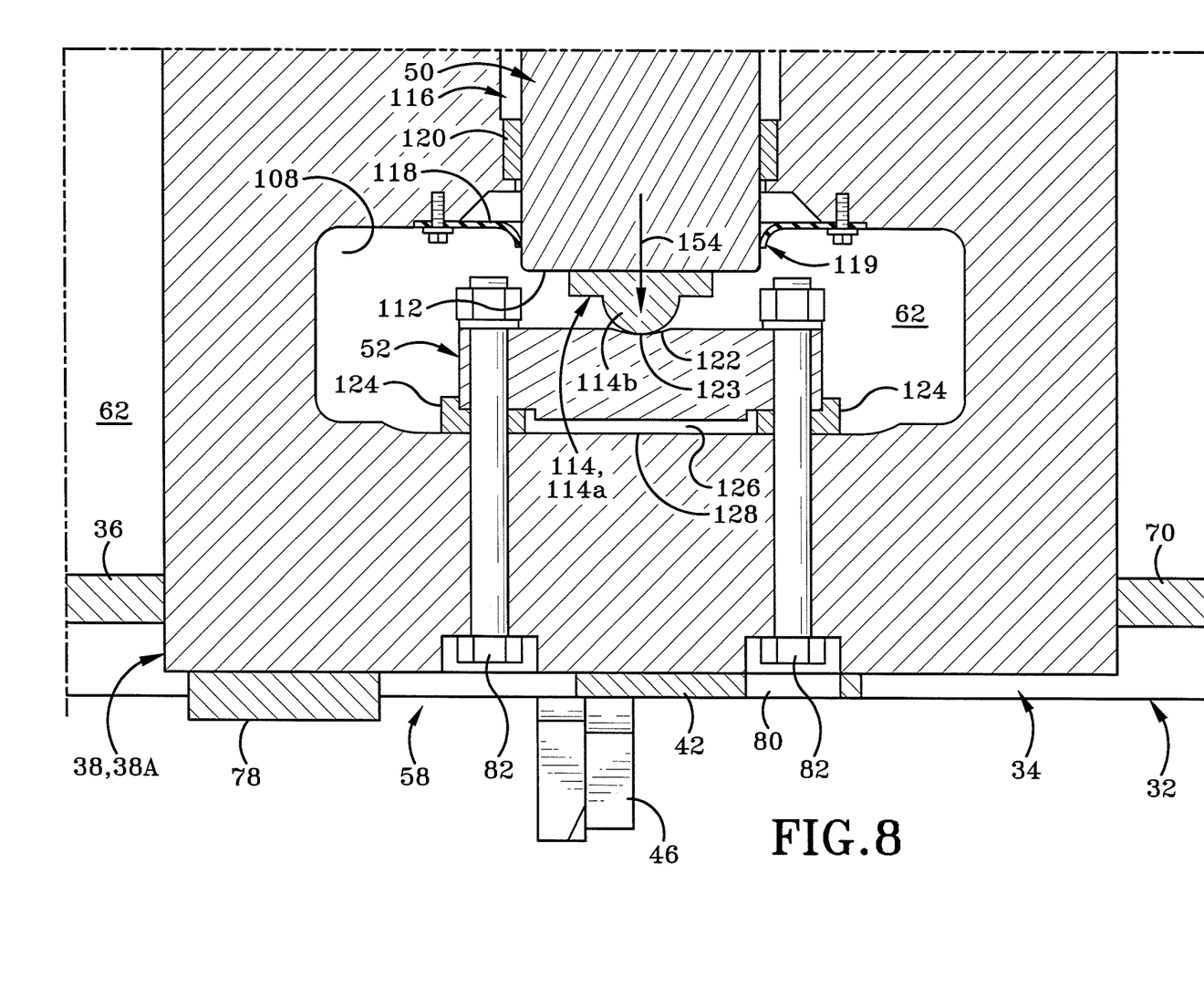
FIG. 8 is a longitudinal cross section taken through the testing assembly along line 8-8 in FIG. 4.

As depicted in FIG. 8, load cell 52 is entirely disposed within aperture 108. End plate 114 is entirely disposed within aperture 108. Second end 112 of rod 50 is disposed within aperture 108. The threaded ends of bolts 82 are disposed within aperture 108. Second annular member is at least partially disposed within aperture 108. Wedge block(s) 124 is at least partially disposed within aperture 108.

Figure 9:
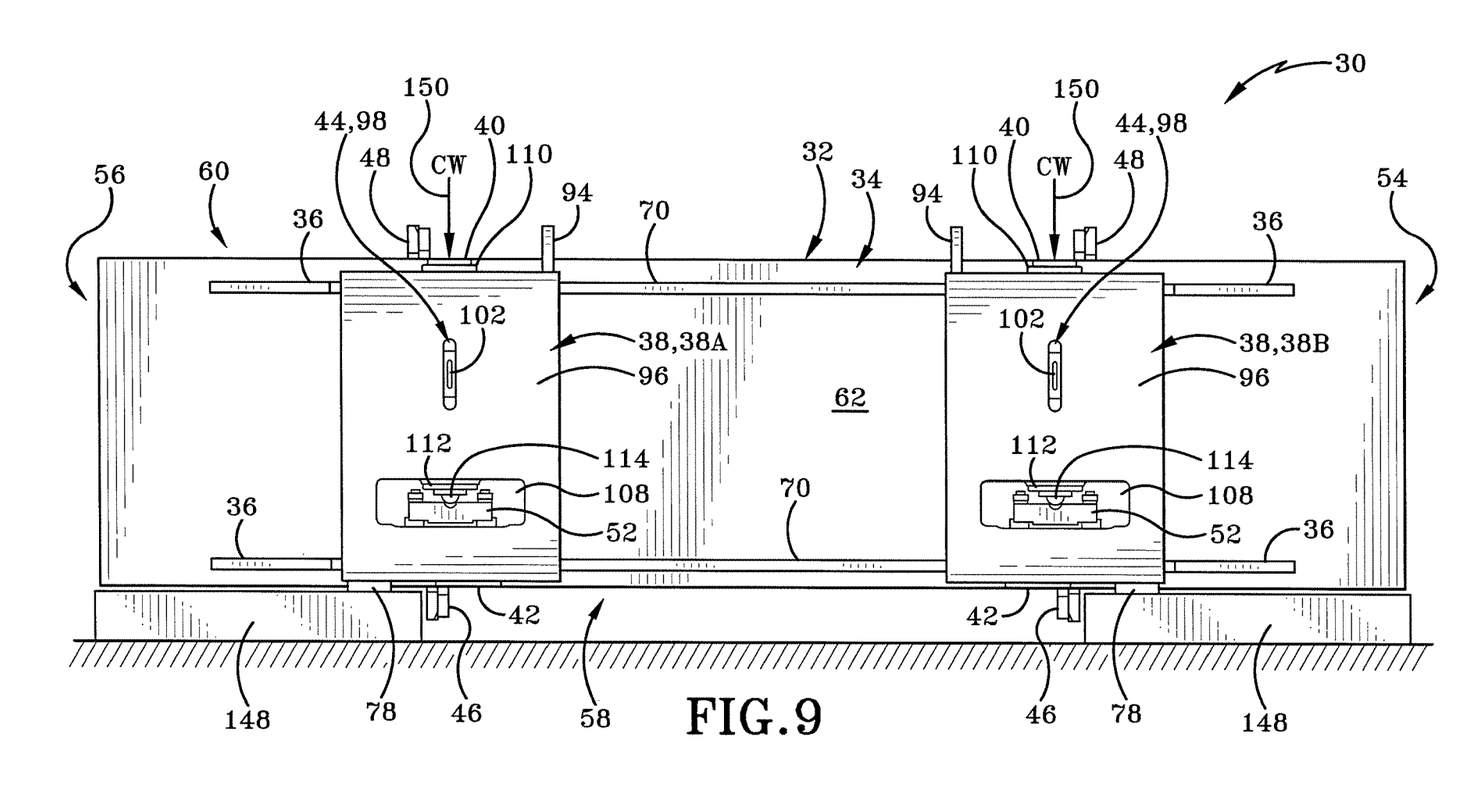
FIG. 9 is a side elevation view of the grip strength tester positioned on its first side extending upwardly during calibration.

As depicted in FIG. 9, prior to testing grip strength of tongs 14 at teeth 16, an operator may calibrate grip strength tester 30. The calibration process may occur in a plurality of different ways and one exemplary embodiment is depicted with grip strength tester 30 positioned on its first side facing downward such that vertical plate 78 lies flush and engages a calibration base station 148. Calibration weight (CW) may be applied to impart a pressure along rod axis 84, which is indicated by a downwardly facing arrow 150 in FIG. 9. Calibration weight CW calibrates load cell 52 to ready load cell 52 for measuring the grip strength of tongs 14.

One exemplary non-limiting load cell 52 contemplated for the present disclosure is Quest Load Cell 125K, wherein the term "125K" refers to load cell capacity measured in pounds. Thus, while the present disclosure contemplates a load cell having a capacity of 125,000 pounds (i.e., 125K), other capacities are entirely possible. Commercially available load cell capacities are typically available in ranges from 1K to 2500K. Furthermore, while load cell 52 may measure grip strength in compression (i.e., a compression load cell), the device could be reconfigured such that grip strength tester 30 measures tong grip strength utilizing tension forces.

Grip strength tester 30 containing load cell 52 may be operatively connected with a computer 200 that includes a processor, a memory, and input/output ports operably connected by a bus. In one example, the computer 200 may include a grip strength logic 202 configured to analyze grip strength data received from load cell 52 and analyze whether tongs 14 have sufficient gripping strength at teeth 16 to determine whether the crane system 10 is able to lift one or more weighted slab(s) 20. In different examples, the grip strength logic 202 may be implemented in hardware, software, firmware, and/or combinations thereof. Thus, the grip strength logic 202 may provide means (e.g., hardware, software, firmware) for receiving data from load cell 52 and making various calculations to establish whether the grip strength is sufficient to complete a desired task. While the grip strength logic 202 is generally illustrated (in FIG. 1) as a hardware component attached to the bus or computer 200, it is to be appreciated that in one example, the grip strength logic 202 could be implemented in the processor.

Generally describing an example configuration of the computer 200, the processor may be a variety of various processors including dual microprocessor and other multi-processor architectures. A memory may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Further, the computer 200 may be disposed within the operator tower 12 (See FIG. 1) such that a computer screen connected to the computer 200 is viewable to the crane operator in the tower 12. Alternatively, the computer may be positioned in a location remote from the operator tower such that grip strength at teeth 16 on tongs 14 may be tested via the grip strength tester 30 and can be analyzed remotely.

The computer 200 can operate in a network environment and thus may be connected to the network devices via the i/o interfaces, and/or the i/o ports. Through the network devices, the computer may interact with a network. Through the network, the computer may be logically connected to remote computers. Networks with which the computer may interact include, but are not limited to, a local area network (LAN), a wide area network (WAN), and other networks. The networks may be wired and/or wireless networks.

Further, the computer 200 may be operatively connected to a remote computing device such as a tablet or a smart phone. Thus, the grip strength logic 202 extends to enabling grip strength testing analysis and results to be provided to an operator or relevant personnel via text, email, or other viewable feature on their remote device (i.e., smartphone/tablet).

"Logic," as used herein, includes but is not limited to hardware, firmware, software and/or combinations of each to perform a function(s) or an action(s), and/or to cause a function or action from another logic, method, and/or system. For example, based on a desired application or needs, the grip strength logic 202 may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

In operation and with reference to FIG. 7-FIG. 10, an operator may open tongs 14 in a conventional articulated scissor-like manner to position teeth 16 closely adjacent wear pad 40 and wear plate 42 on each respective side of testing assembly 38. The opening of the tongs expands (i.e., increases) the distance between teeth 16 on the tongs. In some implementations, crane tongs 14 have two sets of tong teeth such that one pair of tong teeth is closely adjacent the sides grip of testing assembly 38A and another pair of tong grip teeth are closely adjacent the sides of second testing assembly 38B. The operator may actuate pulley assembly 18 to effectuate upward movement of the pulleys thereby imparting a closing (i.e., compressive) force and closing movement of teeth 16 on tongs 14. More particularly, there is a resting first position associated with the frame and a lifted second position associated with the frame. The testing assembly can measure crane tong grip strength when the frame is at the lifted second position. However, other implementations may measure the crane tong grip strength at a single vertical level.

Figure 10:
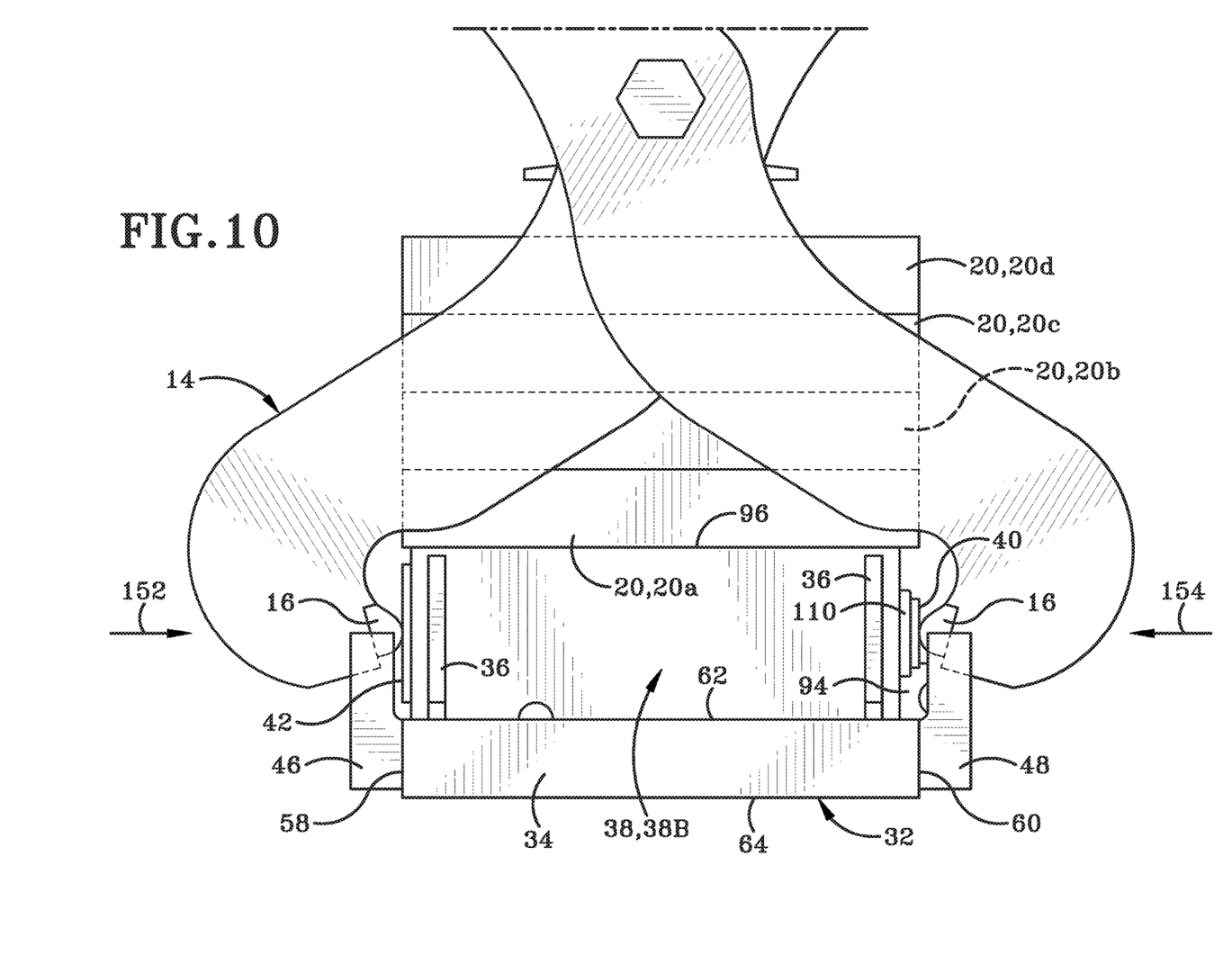
FIG. 10 is first end elevation view of the grip strength tester during operation with a set of crane tongs and weighted slabs carried thereby.

Teeth move inwardly towards each other (i.e., decrease the space therebetween) as they respectively contact wear pad 40 and wear plate 42. The inward movement of teeth 16 on tong 14 is identified by arrows 152 and 154. Arrow 152 is indicated as moving from the first side 58 towards the second side 60 and arrow 154 is indicated as moving from the second side 60 towards the first side 58. Each of the arrows 152, 154 moves along rod axis 84. As the teeth 16 on tongs 14 press against wear pad 40 and wear plate 42, respectively, the compressive pressure exerted along arrows 152, 154 moving towards each other registers pressure in load cell 52.

The testing assembly 38 includes a neutral first position of the testing assembly (non-compressed) and a measuring second position of the testing assembly (compressed). The rod on testing assembly is moveable from the neutral first position to the measuring second position. More particularly, wear pad 40 pushes against rod 50 in the direction of arrow 154. Rod 50 then slides slightly in the direction of arrow 154 while guided by key 102. Slot 130 enables rod 50 to slide in the direction of arrow 154 thereby decreasing the gap 146 on one side of key 102. In one particular embodiment, the gap at the keyway may be the only clearance. The movement of rod 50 pushes end plate 114 in the direction of arrow 154. Simultaneous to the movement of rod 50 is the load cell 52 experiencing a force from teeth 16 in the direction of arrow 152. While load cell 52 does not move relative to arrow 152, it registers a force imparted to load cell 52 at the junction of second portion 114b of end plate 114 with the cut out region 122 or load cell 52 (i.e., the portion that receives end plate 114).

The registered pressure on load cell 52 is uploaded to the computer 200 which is then displayed to an operator to determine, via grip strength logic 202, the grip strength or amount of force the tongs may apply. This information may be used by the operator to determine the grip force of the tongs. The computer system may register the compressive grip strength pressure information and the grip strength logic 202 may determine whether the tongs 14 have sufficient grip strength to lift one or more of the weighted slabs 20. More particularly, the grip strength logic 202 in the computer 200 performs the step of associating the compressive force with an effective grip strength of crane tongs for lifting slabs of weighted material.

In operation and with reference to FIG. 10, an operator may position a first weighted slab 20A above loading region 74. The operational testing for grip strength tester 30 may commence with a single weighted slab 20A positioned above the loading region 74. Load cell 52 may calibrate the grip strength of grip strength tester 30 with a single weighted slab 20A. Then, an operator may load an additional second weighted slab 20B above the first slab 20A in loading region 74. The tester weight plus the additional slab weight is not to be greater than the capacity of the tongs system. The test may commence again with two weighted slabs thereon to determine the grip strength of tongs 14 via tester 30. The information may be uploaded to the computer. An operator may additionally test the tong strength with three weighted slabs by adding a third weighted slab 20C above the first weighted slab 20A and second weighted slab 20B. The load cell 52 may register the grip strength of tongs 14 with three weighted slabs. Additionally, and with specific reference to FIG. 10, a fourth weighted slab 20D may be added to the stack of the three weighted slab 20A, 20B, and 20C. Load cell 52 may register the grip strength of tongs 14 with four weighted slabs thereon. While the number of weighted slabs not intended to be limiting, FIG. 10 is utilized to disclose that one or more weighted slabs may be utilized to purposely add weight to tester 30 in order to test the grip strength of tongs 14 as one having ordinary skill in the art would understand. These tests may be registered and indexed by grip strep strength logic 202 and stored in the memory of computer 200.

By way of non-limiting example, an exemplary set of method steps associated with the use of the grip strength tester 30 may include providing the tong grip strength testing assembly 38 carried by the frame 32. Then, positioning crane tongs 14 adjacent sides of the tong grip strength testing assembly 38. Then, engaging the crane tongs 14 with the tong grip strength testing assembly 38. Then, exerting pressure on the tong grip strength testing assembly 38. Then, measuring the pressure with the load cell 52. Then, determining whether the exerted pressure is sufficient to lift a separate piece of material, such as slab 20.

This exemplary method may also include, subsequent to the step of exerting pressure, moving the rod 50 along a rod axis 84 via the exerted pressure and contacting the second end 112 of the rod 50 with the load cell 52. The step of moving the rod 50 along the rod axis 84 via the exerted pressure is accomplished by decreasing the space between respective teeth 16 on the tongs 14 to create a compressive force. Additionally, this method may include the step of precluding rotational movement of the rod about the rod axis, via the keyway. And, this method may also include the step of precluding movement of the rod 50 relative to the longitudinal axis associated with the frame 32 (i.e., longitudinally extending midline 66).

Subsequent to the step of measuring the pressure with the load cell may include the steps of: comparing the measured pressure with the weight of the slab 20 of metal stored in a weight index on a computer memory; and displaying a result of whether the crane tongs 14 are capable of lifting the weighted slab 20 of metal to an operator in the tower 12.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:
1. A method comprising the steps of:
   providing a tong grip strength testing assembly carried by a frame;

positioning crane tongs adjacent sides of the tong grip strength testing assembly;

engaging the crane tongs with the tong grip strength testing assembly;

exerting pressure on the tong grip strength testing assembly from the crane tongs;

measuring the exerted pressure with a load cell in the tong grip strength testing assembly; and determining whether the exerted pressure is sufficient to lift a separate piece of material.

2. The method of claim 1, wherein subsequent to the step of exerting pressure includes the step of:

moving a rod along a rod axis via the exerted pressure; and contacting an end of the rod with the load cell.

3. The method of claim 2, wherein the step of moving the rod along the rod axis via the exerted pressure is accomplished by decreasing space between respective teeth on the tongs to create a compressive force.

4. The method of claim 2, further comprising the steps of:

precluding rotational movement of the rod about the rod axis; and precluding movement of the rod relative to a longitudinal axis associated with the frame.

5. The method of claim 1, wherein the step of exerting pressure on the tong grip strength testing assembly from the crane tongs is accomplished by lifting the tong grip strength testing assembly from a resting first position to a lifted second position above the resting first position; and the step of measuring pressure with the load cell occurring when the tong grip strength testing assembly is in the lifted second position.

6. A crane tong grip strength tester comprising:

a frame including first and second ends defining a longitudinal axis therebetween and including first and second sides defining a transverse axis therebetween; and a testing assembly carried by the frame, wherein the testing assembly includes a width sized to be received between opposing teeth on a crane tong;

wherein the crane tong grip strength tester determines crane tong grip strength when the teeth engage sides of the testing assembly, wherein the testing assembly includes a rod aligned along a transversely extending rod axis and a load cell operatively connected to the rod.

7. The grip strength tester of claim 6, wherein the testing assembly further includes an end plate on the rod engageable with a cutout formed in the load cell.

8. The grip strength tester of claim 6, wherein the testing assembly further includes:

a wear pad connected to an end of the rod, wherein the wear pad faces outwardly from the testing assembly; and a wear plate facing outwardly in an opposite direction.

9. The grip strength tester of claim 6, wherein the testing assembly further includes a keyway operatively connected to the rod to maintain transverse alignment of the rod during tong strength testing.

10. The grip strength tester of claim 9, wherein the keyway prevents rod movement in a direction associated with the longitudinal axis of the frame.

11. The grip strength tester of claim 9, wherein the keyway prevents rotational movement of the rod about a rod axis.

* * * * *